United States Patent
Kim

(10) Patent No.: US 9,736,323 B2
(45) Date of Patent: Aug. 15, 2017

(54) METHOD OF USING ADDRESS BOOK OF IMAGE FORMING APPARATUS ON WEB BROWSER AND IMAGE FORMING APPARATUS FOR PERFORMING THE SAME

(71) Applicant: SAMSUNG ELECTRONICS CO., LTD., Suwon-si, Gyeonggi-do (KR)

(72) Inventor: Hyun-seok Kim, Suwon-si (KR)

(73) Assignee: S-PRINTING SOLUTION CO., LTD., Suwon-si (KR)

(*) Notice: Subject to any disclaimer, the term of this patent is extended or adjusted under 35 U.S.C. 154(b) by 0 days.

(21) Appl. No.: 14/624,863

(22) Filed: Feb. 18, 2015

(65) Prior Publication Data

US 2015/0237224 A1    Aug. 20, 2015

(30) Foreign Application Priority Data

Feb. 14, 2014   (KR) .................. 10-2014-0017524

(51) Int. Cl.
*G06F 3/12* (2006.01)
*G06K 15/00* (2006.01)
*H04N 1/40* (2006.01)
*H04N 1/00* (2006.01)

(52) U.S. Cl.
CPC ..... *H04N 1/00395* (2013.01); *H04N 1/00411* (2013.01); *H04N 1/00493* (2013.01)

(58) Field of Classification Search
None
See application file for complete search history.

(56) References Cited

U.S. PATENT DOCUMENTS

| | | | | |
|---|---|---|---|---|
| 6,292,481 B1* | 9/2001 | Voit | ........................ | H04L 12/14 370/352 |
| 6,728,934 B1* | 4/2004 | Scopes | .............. | G06F 17/30899 379/88.13 |
| 7,634,463 B1* | 12/2009 | Katragadda | ............ | G06Q 10/10 701/431 |
| 7,685,144 B1* | 3/2010 | Katragadda | ........... | G06F 3/0237 707/999.101 |
| 7,890,136 B1* | 2/2011 | Fujisaki | ................ | H04M 1/575 455/12.1 |
| 8,214,387 B2* | 7/2012 | King | .................. | H04N 1/00244 235/375 |
| 8,607,325 B2* | 12/2013 | Kennedy | ................. | G06F 21/55 726/12 |
| 9,076,526 B2* | 7/2015 | Chung | .................. | G11C 15/04 |

(Continued)

*Primary Examiner* — Madelein Nguyen
(74) *Attorney, Agent, or Firm* — Staas & Halsey LLP

(57) ABSTRACT

A method of using an address book of an image forming apparatus on a web browser includes receiving web data in an image forming apparatus from a web server; displaying a web page corresponding to the received web data on a display unit of the image forming apparatus; receiving an input of selecting one of at least one input box comprised in the web page; analyzing a form tag corresponding to the selected input box from the web data; and displaying a virtual text input device or an address list on the display unit based on the analysis result in which the selected input box is determined as an input box for receiving an input of an email address or a phone number, wherein the virtual keyboard is capable of being synchronized with an address book of the image forming apparatus.

19 Claims, 12 Drawing Sheets

(56) References Cited

U.S. PATENT DOCUMENTS

| | | | |
|---|---|---|---|
| 9,262,446 B1* | 2/2016 | Katragadda | G06F 17/243 |
| 2002/0057446 A1* | 5/2002 | Long | G06F 9/3879 |
| | | | 358/1.13 |
| 2004/0243939 A1 | 12/2004 | Perepa et al. | |
| 2005/0078335 A1* | 4/2005 | Morris-Jones | H04N 1/00342 |
| | | | 358/1.15 |
| 2005/0097189 A1 | 5/2005 | Kashi | |
| 2006/0009243 A1* | 1/2006 | Dahan | H04L 12/581 |
| | | | 455/466 |
| 2007/0086051 A1* | 4/2007 | Kunori | H04N 1/00127 |
| | | | 358/1.15 |
| 2008/0278438 A1* | 11/2008 | Brown | G06Q 30/02 |
| | | | 345/156 |
| 2009/0011780 A1* | 1/2009 | Salinas | H04L 51/38 |
| | | | 455/466 |
| 2009/0021780 A1* | 1/2009 | Sato | H04N 1/00347 |
| | | | 358/1.15 |
| 2009/0077383 A1* | 3/2009 | de Monseignat | H04L 63/0823 |
| | | | 713/175 |
| 2009/0254895 A1* | 10/2009 | Chen | G06F 8/4442 |
| | | | 717/161 |
| 2009/0282345 A1* | 11/2009 | Smith | G06F 17/243 |
| | | | 715/744 |
| 2009/0313299 A1* | 12/2009 | Bonev | G06Q 10/109 |
| 2010/0094878 A1* | 4/2010 | Soroca | G06F 17/30035 |
| | | | 707/748 |
| 2010/0234052 A1* | 9/2010 | Lapstun | B41J 3/445 |
| | | | 455/466 |
| 2010/0287307 A1* | 11/2010 | John | H04L 67/02 |
| | | | 709/248 |
| 2011/0010612 A1* | 1/2011 | Thorpe | G06F 17/30899 |
| | | | 715/234 |
| 2011/0055277 A1* | 3/2011 | Resch | G06F 11/1004 |
| | | | 707/785 |
| 2011/0173397 A1* | 7/2011 | Boyle | G06F 12/0862 |
| | | | 711/137 |
| 2012/0040644 A1* | 2/2012 | Naik | H04M 1/72522 |
| | | | 455/412.1 |
| 2012/0136936 A1* | 5/2012 | Quintuna | G06F 21/604 |
| | | | 709/204 |
| 2012/0158751 A1* | 6/2012 | Tseng | G06Q 30/02 |
| | | | 707/751 |
| 2012/0190386 A1* | 7/2012 | Anderson | G01C 15/04 |
| | | | 455/456.3 |
| 2012/0204032 A1* | 8/2012 | Wilkins | H04L 9/006 |
| | | | 713/170 |
| 2012/0239417 A1* | 9/2012 | Pourfallah | G06Q 50/22 |
| | | | 705/2 |
| 2013/0097526 A1* | 4/2013 | Stovicek | G06Q 10/107 |
| | | | 715/752 |
| 2013/0132547 A1* | 5/2013 | Reed | G06Q 50/01 |
| | | | 709/223 |
| 2013/0145138 A1* | 6/2013 | Kyprianou | G06F 15/177 |
| | | | 713/1 |
| 2013/0254035 A1* | 9/2013 | Ramer | G06Q 30/0256 |
| | | | 705/14.62 |
| 2013/0268357 A1* | 10/2013 | Heath | H04L 63/00 |
| | | | 705/14.53 |
| 2014/0092438 A1* | 4/2014 | Schultz | G06F 3/0484 |
| | | | 358/1.18 |
| 2014/0195921 A1* | 7/2014 | Grosz | G06F 3/1242 |
| | | | 715/738 |
| 2015/0149887 A1* | 5/2015 | Kim | G06F 17/2247 |
| | | | 715/234 |
| 2015/0326708 A1* | 11/2015 | Ginzburg | H04M 1/72552 |
| | | | 715/752 |
| 2015/0363478 A1* | 12/2015 | Haynes | G06F 17/30575 |
| | | | 707/625 |
| 2016/0098698 A1* | 4/2016 | Gopalakrishna | G06Q 20/322 |
| | | | 705/71 |
| 2016/0110523 A1* | 4/2016 | Francois | G06Q 50/24 |
| | | | 705/2 |
| 2016/0210602 A1* | 7/2016 | Siddique | G06Q 20/0453 |

* cited by examiner

METHOD OF USING ADDRESS BOOK OF IMAGE FORMING APPARATUS ON WEB BROWSER AND IMAGE FORMING APPARATUS FOR PERFORMING THE SAME

CROSS-REFERENCE TO RELATED APPLICATIONS

This application claims the benefit of Korean Patent Application No. 10-2014-0017524, filed on Feb. 14, 2014, in the Korean Intellectual Property Office, the disclosure of which is incorporated herein in its entirety by reference.

BACKGROUND

1. Field

One or more embodiments of the present disclosure relate to an image forming apparatus that supports a web browser, and more particularly, to a method of using an address book of an image forming apparatus on a web browser.

2. Description of the Related Art

Recently, web browsers used for internet connection or web applications have been widely supported by an image forming apparatus such as a printer, a scanner, or a multi-functional machine.

A web browser receives web data in hypertext mark-up language (HTML) format from a web server, analyzes the web data, and then displays a web page on a display unit of an image forming apparatus. However, such a web browser only serves to display a web page corresponding to web data provided by a web server, and thus, in order to synchronize the web page with a specific function of an image forming apparatus or information stored in the image forming apparatus, the web server needs to implement such synchronization between the web page and the image forming apparatus.

That is, if a web server does not implement such synchronization, there may be inconveniences that a user is not allowed to use a function of an image forming apparatus or information stored in an image forming apparatus on a web browser.

SUMMARY

One or more embodiments of the present disclosure include a method of using an address book stored in an image forming apparatus on a web browser by synchronizing the address book with a web page.

Additional aspects will be set forth in part in the description which follows and, in part, will be apparent from the description, or may be learned by practice of the presented embodiments.

According to one or more embodiments of the present disclosure, a method of using an address book of an image forming apparatus on a web browser includes: receiving web data in an image forming apparatus from a web server; displaying a web page corresponding to the received web data on a display unit of the image forming apparatus; receiving an input of selecting one of at least one input box comprised in the web page; analyzing a form tag corresponding to the selected input box from the web data; and displaying a virtual text input device or an address list on the display unit based on the analysis result in which the selected input box is determined as an input box that receives an input of an email address or a phone number, wherein the virtual keyboard is capable of being synchronized with an address book of the image forming apparatus.

Here, the analyzing of the form tag may include determining the input box as an input box that receives an input of an email address or a phone number when an input tag included in the form tag is an "email" type or a "tel" type supported by hypertext markup language (HTML) 5.

In addition, the displaying of the virtual text input device or the address list on the display unit may include identifying attributes included in the form tag; determining a virtual text input device or an address list to be displayed on the display unit according to the identified attributes; and displaying the determined virtual text input device or the determined address list.

Here, the determining of the virtual text input device or the address list may include displaying the address list when a "list" attribute is included in the form tag, in which the "list" attribute designates the address book of the image forming apparatus.

Alternatively, the determining of the virtual text input device or the address list may include displaying a filtered address list when a "pattern" attribute is included in the form tag.

The virtual text input device capable of being synchronized with the address book of the image forming apparatus may include a button that loads the address list.

In addition, the method may further include: receiving an input value of an email address or a phone number by using the virtual text input device; performing validation with respect to the received input value; and displaying the input value on the selected input box when the received input value is a valid email address or a valid phone number.

According to one or more embodiments of the present disclosure, an image forming apparatus for supporting a web browser includes: a display unit for displaying a screen; a communication unit for receiving web data by performing communication with an external web server; a storage unit for storing an address book; a web browser for displaying a web page corresponding to the received web data and synchronizing with the stored address book of the image forming apparatus on the web page; an image forming job execution unit for performing an image forming job; and a control unit. In this regard, upon receiving an input of selecting one of at least one input box comprised in the web page, the web browser analyzes a form tag corresponding to the selected input box, determines that the selected input box as an input box that receives an input of an email address or a phone number, and then displays a virtual text input device or an address list on the display unit, in which the virtual text input device is capable of being synchronizing with the address book of the image forming apparatus.

Here, the web browser may include a web data interpretation unit for generating a web page to be displayed by interpreting the web data; and a form handler for determining whether the selected input box is regarded as an input box that receives an input of an email address or a phone number by analyzing the form tag corresponding to the selected input box from the web data.

In addition, the form handler may determine the input box is as an input box that receives an input of an email address or a phone number when an input tag comprised in the form tag is an "email" type or a "tel" type supported by HTML5.

In addition, the form handler may identify attributes comprised in the form tag, and accordingly, may determine a virtual text input device or an address list to be displayed on the display unit.

Here, the form handler may determine whether to display the address list when a "list" attribute is comprised in the form tag, wherein the "list" attribute designates the address book of the image forming apparatus.

Alternatively, the form handler may determine whether to display a filtered address list when a "pattern" attribute is comprised in the form tag.

The virtual text input device capable of being synchronized with the address book of the image forming apparatus comprises a button that loads the address list.

In addition, the web browser may receive an input value of an email address or a phone number by using the virtual text input device, performs validation with respect to the received input value, and then displays the input value on the selected input box when the received input value is a valid email address or a valid phone number.

According to one or more embodiments of the present disclosure, a method of entering data in an image forming apparatus is described. The method includes displaying web data on a display unit of the image forming apparatus, determining whether a selected input box of the displayed web data is for receiving an input of an email address or a phone number, and displaying a virtual keyboard on the display unit when the selected input box is determined as an input box for receiving the input of the email address or the phone number, wherein the displayed virtual keyboard is configured to be synchronized with an address book stored in the image forming apparatus.

According to one or more embodiments of the present disclosure, an image forming apparatus is for supporting a web browser is described. The image forming apparatus includes a communication unit for receiving web data by communicating with an external web server, a display unit for displaying the received web data, a storage unit for storing an address book, and a control unit, for determining whether a selected input box of the displayed web data is for receiving an input of an email address or a phone number, and for controlling the display unit to display a virtual keyboard when the selected input box is determined as an input box for receiving the input of the email address or the phone number, wherein the virtual keyboard displayed on the display unit is configured to be synchronized with the address book stored in the storage unit.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
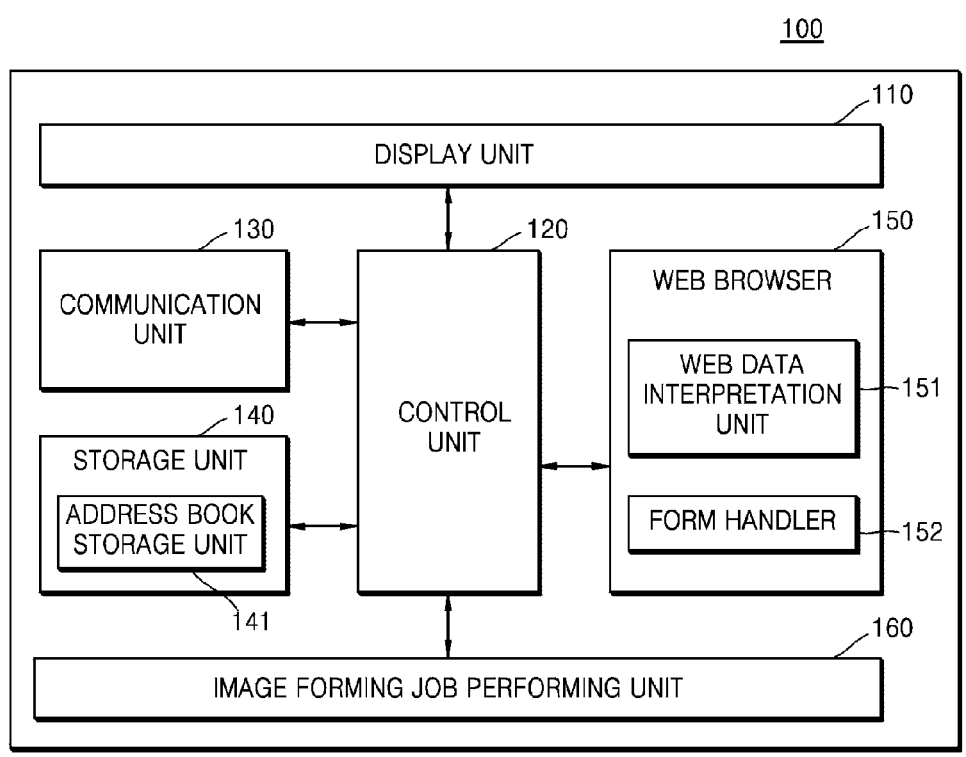
FIG. 1 is a block diagram illustrating an image forming apparatus according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Before describing embodiments of the present disclosure, new input tag types, i.e., "email" and "tel", provided by hypertext mark-up language (HTML) 5 will be described.

HTML5 supports an "email" input tag and a "tel" input tag, each of which is used in a form tag to designate an input box for receiving an input of an email address or a phone number, respectively. Accordingly, the input box for receiving an email address or a phone number may be easily designated when making a web page using HTML5. In addition, when these input tags are used, upon selection of an input box by a user, a virtual keyboard for inputting appropriate values in the selected input box is provided. When the user inputs a value into the selected input box, the input value is then subjected to validation to determine whether the input value is a valid email address or a valid phone number.

However, in spite of using these input tags, the virtual keyboard provided herein has no function to synchronize with the address book of an image forming apparatus. Thus, in order to use the address book stored in the image forming apparatus on the web browser, the web page or web application developer has to directly implement such synchronization as is conducted in the related art.

Therefore, in embodiments described below, the "email" input tag or the "tel" input tag are used as an application programming interface (API) so that the address book stored in the image forming apparatus may be used on the web browser.

FIG. 1 is a block diagram of an image forming apparatus 100 according to an embodiment of the present disclosure. Referring to FIG. 1, the image forming apparatus 100 may include, for example, a display unit 110, a control unit 120, a communication unit 130, a storage unit 140, a web browser 150, and an image forming job performing unit 160. In addition, the storage unit 140 may include an address book storage unit 141 in which an address book is stored, and the web browser 150 may include a web data interpretation unit 151 and a form handler 152.

The display unit 110 may display a user interface (UI) screen that includes menus or information of operations of the image forming apparatus 100. A user may identify a status of the image forming apparatus 100 through the UI screen displayed on the display unit 110 and may input an operation command. In addition, the display unit 110 may be implemented as a touch screen, and thus, may receive a touch input by the user.

The control unit 120 may perform a role in controlling operations of all components included in the image forming apparatus 100. The control unit 120 may be implemented as a microprocessor or the like. Even if the control unit 120 in reality is formed as a plurality of separate components, the plurality of the components may be considered to be included in the control unit 120 so long as the plurality of the components perform a role in controlling operations included in the image forming apparatus 100.

The communication unit 130 may perform communication with the Internet or an external web server. The communication unit 130 may support wire communication via the Ethernet or wireless communication via Wi-Fi.

The storage unit 140 may store various programs and information related to operations of the image forming apparatus 100 therein. In particular, the address book storage unit 141 may store an address book that includes any one or more of an email address, a phone number, a fax number, or the like.

The web browser 150 allows a user to search for an Internet web page with the image forming apparatus 100 or to use a web application provided by a solution provider. The web browser 150 may include the web data interpretation unit 151 and the form handler 152.

The web data interpretation unit 151 may interpret web data that the communication unit 130 receives from a web server, so as to output a web page screen. In general, web data is written using HTML, and the web data interpretation unit 151 outputs a web page by interpreting the HTML.

The form handler 152 may perform processing of a display and an input of a form tag defined by HTML. The form handler 152 may enable synchronization with the address book stored in the image forming apparatus 100 when a user selects an input box for receiving an input of an email address or a phone number.

In detail, when the user selects an input box included in a web page, a form tag corresponding to the selected input box is analyzed from the web data, so as to determine whether the selected input box is an input box for receiving an input of an email address or a phone number. When the selected input box is determined as an input box for receiving an input of an email address or a phone number, the form handler 152 displays a virtual keyboard or an address list on the display unit 110, in which the virtual keyboard is capable of being synchronized with the address book stored in the address book storage unit 141 of the image forming apparatus 100. Here, the form handler 152 determines whether to display the virtual key board or the address book by identifying attributes included in the form tag. Alternatively, the form handler 152 may determine types and forms of the virtual keyboard to display.

When an input tag included in the form tag corresponding to the selected input box is an "email" type or a "tel" type supported by HTML5, the form handler 152 determines the selected input box as an input box for receiving an input of an email address or a phone number based on the input tag.

In addition, the form handler 152 may be embedded in the web browser 150, but also may be implemented in a plug-in form on the web browser or as a module within an external application including the web browser 150.

When the web browser 150 supports installations of plug-in programs, such as NPAPI, ActiveX, Firefox Extension, and Chrome Extension, these plug-in programs may determine attributes of the selected input box. When the plug-in program is installed on the web browser 150, the installed plug-in program uses coordinates of a location on which a user touches the display unit 110 and web browser APIs to determine whether the form tag corresponding to the input box with the touch coordinates includes an input tag in an "email" type or a "tel" type.

Alternatively, the plug-in program installed on the web browser 150 uses all the web browser APIs to search for all the input tags of an "email" type or a "tel" type present on the web data. Then, on an input box corresponding to the input tags, the plug-in program registers a listener that responds to the user's touch input. When the user selects the input box, the plug-in program determines the input box as an input box for receiving an input of an email address or a phone number.

In addition, when in a method of including an engine of a web browser in an external application, such as a web view or a web widget, other than the web browser 150, the application may use coordinates of a location where a user touches the display unit 110, and web view APIs or web widget APIs to determine whether the form tag corresponding to the input box with the touch coordinates includes an input tag in an "email" type or a "tel" type.

Alternatively, the application may use all the web view APIs or web widget APIs to search for all the input tags of an "email" type or a "tel" type present on the web data. Then, on an input box corresponding to the input tags, the application may register a listener that responds to the user's touch input. When the user selects the input box, the application determines the input box as an input box for receiving an input of an email address or a phone number.

Detailed examples of the form handler 152 that displays a virtual keyboard or an address list on the display unit 110 according to the result of the form tag analysis are described in connection with description of FIGS. 2 to 10 below.

The image forming job performing unit 160 may perform an image forming job such as printing, scanning, or faxing. The image forming job performing unit 160 may perform an image forming job according to an operation command received from the control unit 120.

FIGS. 2 to 10 are diagrams illustrating UI screens that appear when a method of using an address book of the image forming apparatus on the web browsers is performed according to embodiments of the present disclosure. In detail, FIGS. 2 to 6 illustrate examples of displaying a virtual keyboard or an address list upon selection of an input box for receiving an input of an email address. Here, the virtual keyboard or the address book list is capable of being synchronized with or is configured to be synchronized with an address book, such as the the address book of the image forming apparatus 100. FIGS. 7 to 10 illustrate examples of displaying a virtual keyboard or an address book list upon selection of an input box for receiving an input of a phone number, in which the virtual keyboard or the address book list is capable of being synchronized or is configured to be synchronized with the address book.

Hereinafter, UI screens shown in FIGS. 2 to 10 will be described in detail with reference to FIG. 1.

Figure 2:
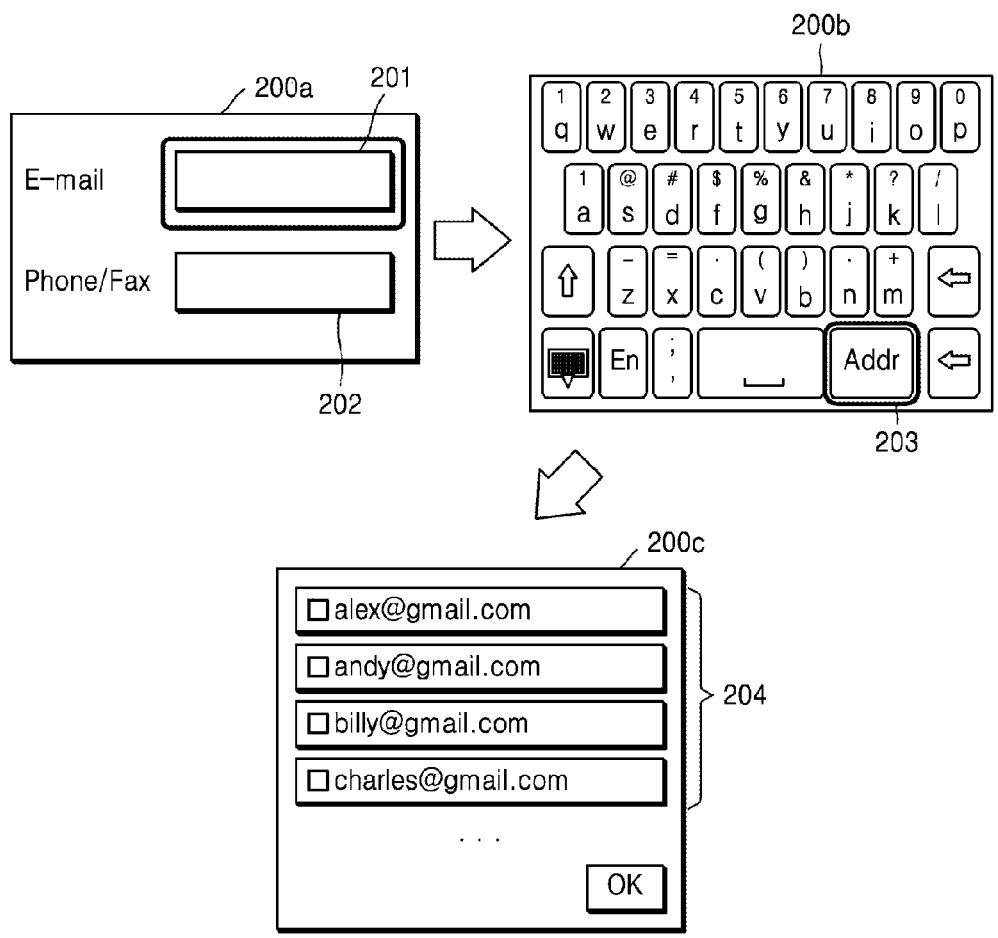
FIG. 2 illustrates an example of displaying a virtual keyboard capable of being synchronizing with an address book of the image forming apparatus upon selection of an input box that receives an input of an email address.

FIG. 2 is a diagram illustrating an example of displaying a virtual keyboard that is capable of being synchronized with an address book or is configured to be synchronized with the address book. In FIG. 2, a virtual keyboard that is capable of being synchronized with an address book is displayed upon selection of an input box for receiving an input of an email address. Referring to FIG. 2, an email address input box 201 and a phone number input box 202 are present on a web page 200a displayed on the display unit 110 of the image forming apparatus 100.

When a user selects or touches the email address input box 201, the form handler 152 of the web browser 150 analyzes a form tag that corresponds to the email address input box 201 from web data. The form handler 152 confirms if an input tag included in the form tag is an "email" type, and if so, determines that the email address input box 201 is an input box for receiving an input of an email address. Then, based on the determination, the form handler 152 displays a virtual text input device 200b, which is capable of being synchronized with the address book, on the display unit 110.

The virtual text input device 200b basically includes English alphabet buttons to enter an email address, and an address book button 203.

A user may directly enter an email address by using buttons on the virtual text input device 200b to enter the required alphanumeric characters to form the email address, or may load an address book by using the address book button 203. When the user selects the address book button 203 on the virtual text input device 200b, an address list screen 200c is displayed on the display unit 110. Here, a plurality of address entries obtained from the address book are shown on address list 204.

An email address to which the user wants to send image data or the like may be selected from the plurality of address entries shown on the address list 204. Thus, the selection of a desired address entry from the list of the address book stored in the image forming apparatus 100 may reduce the inconvenience resulting from the user having to manually input the email address and may prevent a mistake in which the user inputs an incorrect email address.

In addition, the user may directly enter an email address by using the virtual text input device 200b. When the user inputs an email address by using the virtual text input device 200b, the form handler 152 verifies whether the input value is a valid email address. When the input value is determined as a valid email address as a result of the validation, the email address that is input by the user is displayed on the email address input box 201.

In addition, various attributes may be included in a form tag of web data written by HTML 5. Contents displayed on the screen or subsequent operations may vary depending on these attributes included therein. Hereinafter, a screen displayed or an operation according to the attributes included in the form tag will be described.

Figure 3:
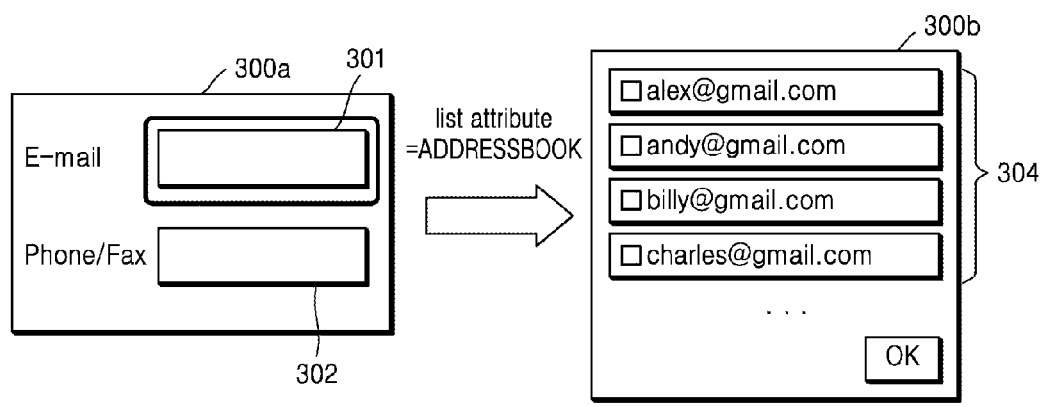
FIG. 3 illustrates an example of immediately displaying an address list when a "list" attribute is included in a form tag upon selection of an input box that receives an input of an email address.

FIG. 3 illustrates an example of displaying an address list immediately when a "list" attribute is included in the form tag upon selection of an input box for receiving an input of an email address. In the case of including the "list" attribute in the form tag for designating an address book stored in the address book storage unit 141 of the image forming apparatus 100, as shown in FIG. 3, the form handler 152 may immediately display an address book list screen 300b when the user selects an email address input box 301 on a web page 300a. That is, the user may directly select an email address from address entries 304 by displaying the address book list screen 300b rather than a virtual keyboard. The address entries 304 may be obtained from an address book stored in the image forming apparatus 100.

Figure 4:
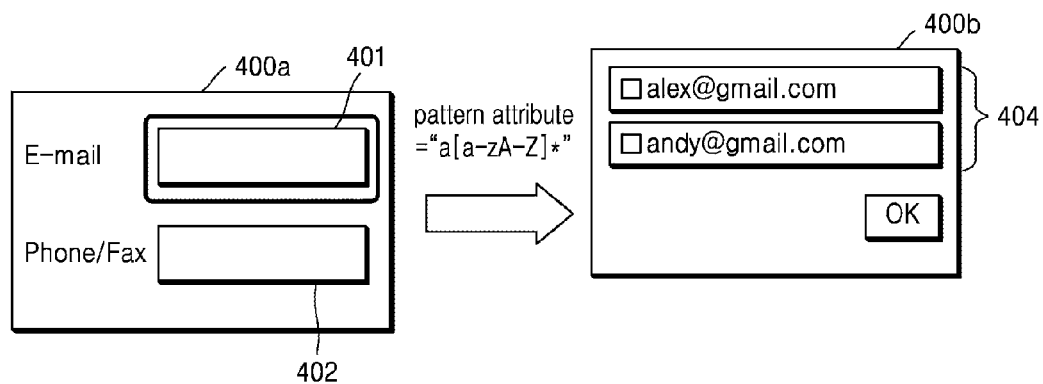
FIG. 4 illustrates an example of displaying a filtered address list when a "pattern" attribute is included in a form tag upon selection of an input box that receives an input of an email address.

FIG. 4 illustrates an example of displaying a filtered address list when a "pattern" attribute is included in the form tag upon selection of an input box for receiving an input of an email address. In the case of inclusion of the "pattern" attribute in the form tag, only results that are filtered as defined in the attribute are shown on a screen. Referring to FIG. 4, the "pattern" attribute is defined as "a[a-zA-z]*". Thus, when the user selects an email address input box 401 on a web page, the form handler 152 only displays email address entries beginning with 'a' and consisting of alphabet letters when the user begins entering the email address by entering the character "a". Therefore, only filtered address entries are displayed on an address list screen 400b. That is, depending on how a "pattern" attribute is defined, the form handler 152 may be configured to only display one or more email address entries 404 beginning with a first character when the user begins entering the email address by entering the first character. The one or more email address entries 404 may be obtained from an address book stored in the image forming apparatus 100.

Figure 5:
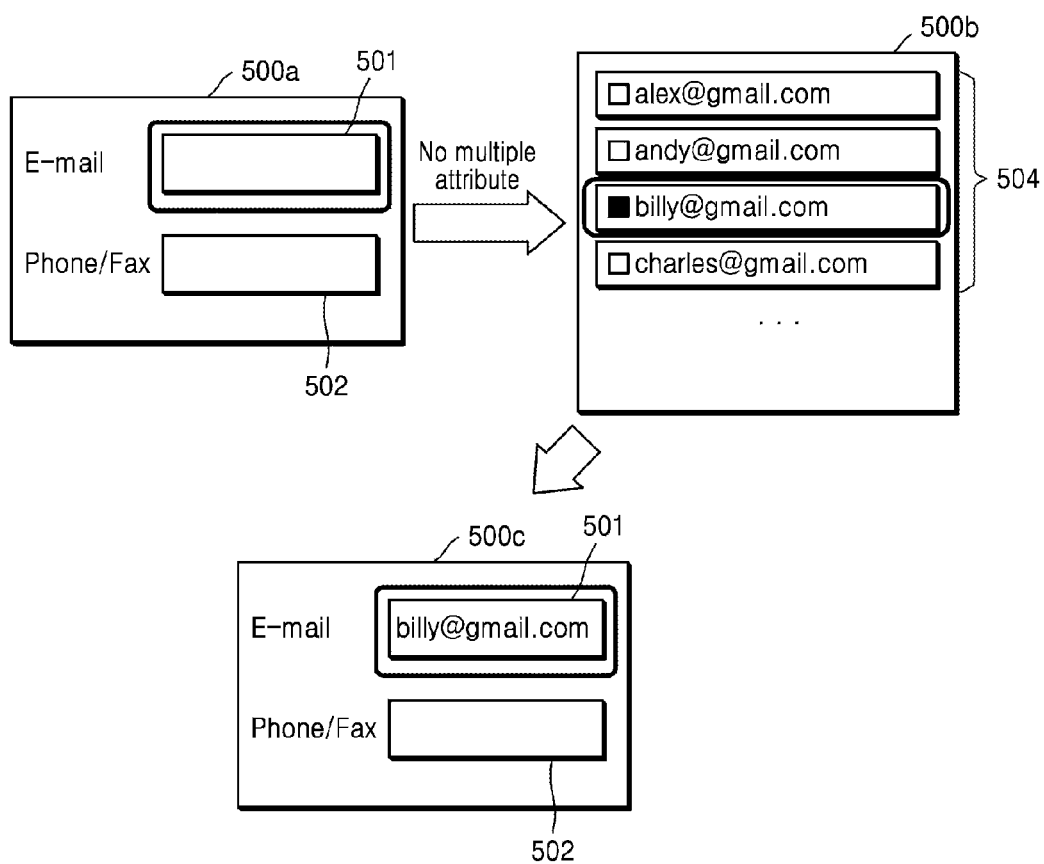
FIG. 5 illustrates an examples of receiving an input of selecting an address entry when a "multiple" attribute is not included in a form tag upon selection of an input box that receives an input of an email address.

FIG. 5 illustrates an example of selecting an address entry when a "multiple" attribute is not included in a form tag upon selection of an input box for receiving an input of an email address. Referring to FIG. 5, when a user selects an email address input box 501 on a web page 500a, the form handler 152 displays an address book list screen 500b. When the "multiple" attribute is not included in the form tag, the user may select only one entry from a plurality of address entries 504 displayed on the address book list screen 500b.

That is, when the user selects any one of the plurality of the address entries 504, the form handler 152 displays the selected email address on the email address input box 501 on the web page 500c.

Figure 6:
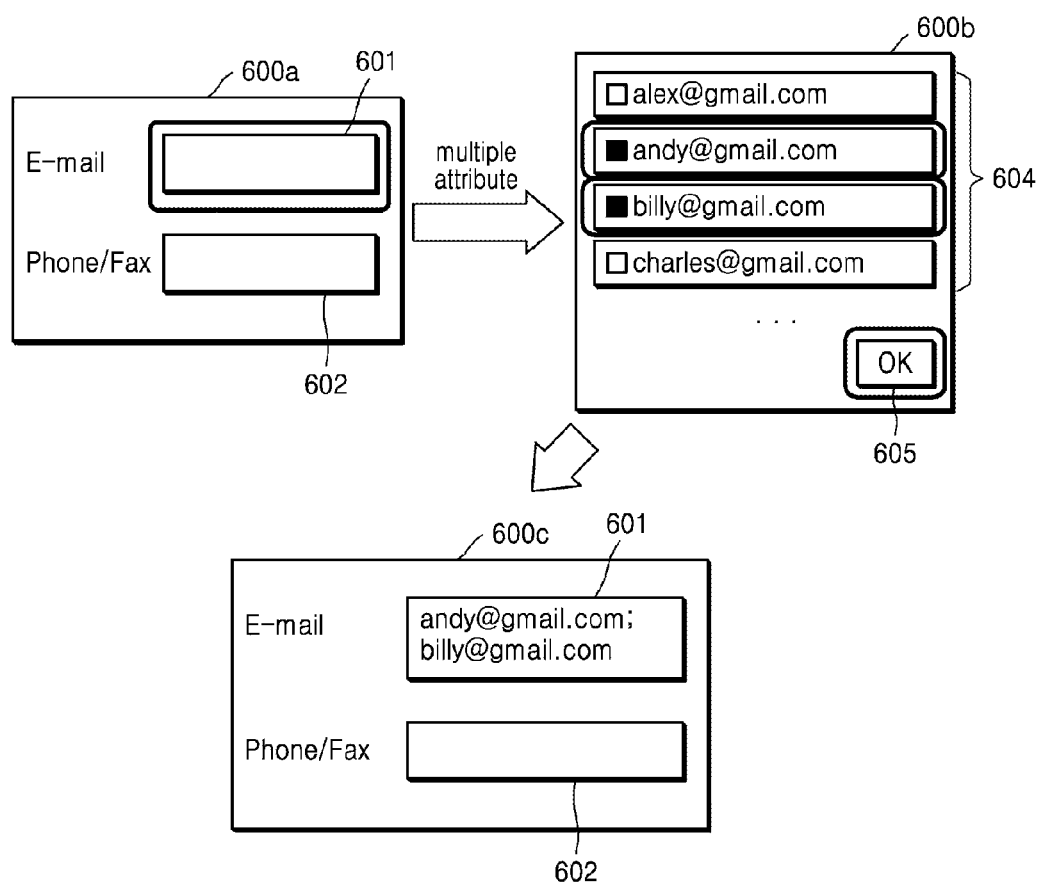
FIG. 6 illustrates an examples of receiving an input of selecting an address entry when a "multiple" attribute is included in a form tag upon selection of an input box that receives an input of an email address.

FIG. 6 illustrates an example of selecting an address entry when a "multiple" attribute is included on a form tag upon selection of an input box for receiving an input of an email address. Referring to FIG. 6, when a user selects an email address input box 601 on a web page 600a, the form handler 152 displays an address book list screen 600b. When the "multiple" attribute is included in the form tag, the user may select two or more entries from a plurality of address entries 604 displayed on the address book list screen 600b.

Therefore, when the user presses an OK button 605 after selecting all the desired address entries from the plurality of address entries 604, the form handler 152 determines that the selection of the address entries is completed, and then displays the selected email addresses on the web page 600c.

Figure 7:
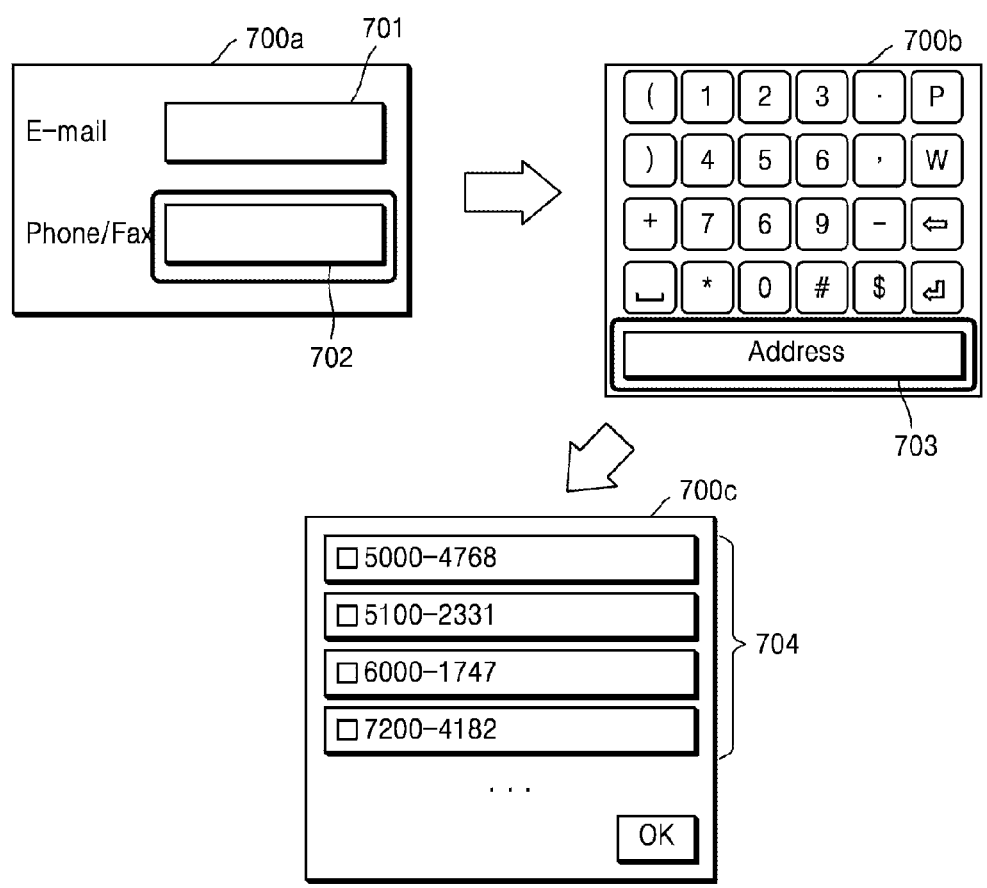
FIG. 7 illustrates an examples of displaying a virtual keyboard capable of being synchronizing with an address book of the image forming apparatus upon selection of an input box that receives an input of a phone number.

FIG. 7 illustrates an example of displaying a virtual keyboard that is capable of being synchronized with an address book upon selection of an input box for receiving an input of a phone number. Referring to FIG. 7, an email address input box 701 and a phone number input box 702 are present on a web page 700a displayed on the display unit 110 of the image forming apparatus 100.

When a user touches or selects the phone number input box 702, the form handler 152 of the web browser 150 analyzes a form tag that corresponds to the phone number input box 702 from web data. The form handler 152 confirms if an input tag included in the form tag is a "tel" type, and if so, determines that the phone number input box 702 is an input box for receiving an input of a phone number. Then, based on such determination, the form handler 152 displays a virtual text input device 700b, which is capable of being synchronized with or is configured to be synchronized with the address book, on the display unit 110.

The virtual text input device 700b capable of being synchronized with the address book basically includes numeric buttons for entering a phone number and an address book button 703.

The user may directly enter a phone number by using numeric buttons on the virtual text input device 700b, or may load an address book using the address book button 703. When the user selects the address book button 703 on the virtual input device 700b, an address book list screen 700c is displayed on the display unit 110. Here, a plurality of address entries 704 are shown on the address book list screen 700c.

A phone number, i.e., a fax number, to where the user wants to send image data or the like may be selected from the plurality of address entries 704 shown on the address book list screen 700c. Thus, the selection of a desired address entry from the list of the address book stored in the image forming apparatus 100 may reduce the inconvenience caused by the user having to manually input the phone number and may prevent a mistake in which the user inputs an incorrect phone number.

In addition, the user may directly input a phone number by using the virtual text input device 700b. When the user inputs a phone number 700b, the form handler 152 verifies whether the input value is a valid phone number. Alternatively, in another embodiment, the form handler 152 may verify whether the input phone number is in a valid phone number format. When the input value is determined as a valid phone number as a result of the validation, the phone number that is input by the user is displayed on the email address input box 702.

Figure 8:
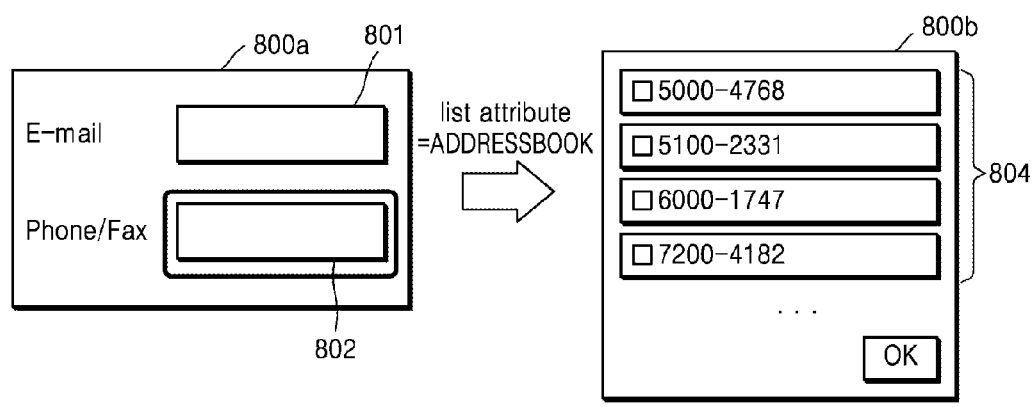
FIG. 8 illustrates an example of immediately displaying an address list when a "list" attribute is included in a form tag upon selection of an input box that receives an input of a phone number.

FIG. 8 illustrates an example of displaying an address list immediately when a "list" attribute is included in a form tag upon selection of an input box for receiving an input of a phone number. In the case of including the "list" attribute in the form tag for designating an address book stored in the address book storage unit 141 of the image forming apparatus 100, as shown in FIG. 8, the form handler 152 immediately displays an address look list screen 800b when the user selects a phone number input box 802 on a web page 800a. That is, the user may directly select a phone number from the address entries 804 by displaying the address book list screen 800b rather than using a virtual keyboard.

Figure 9:
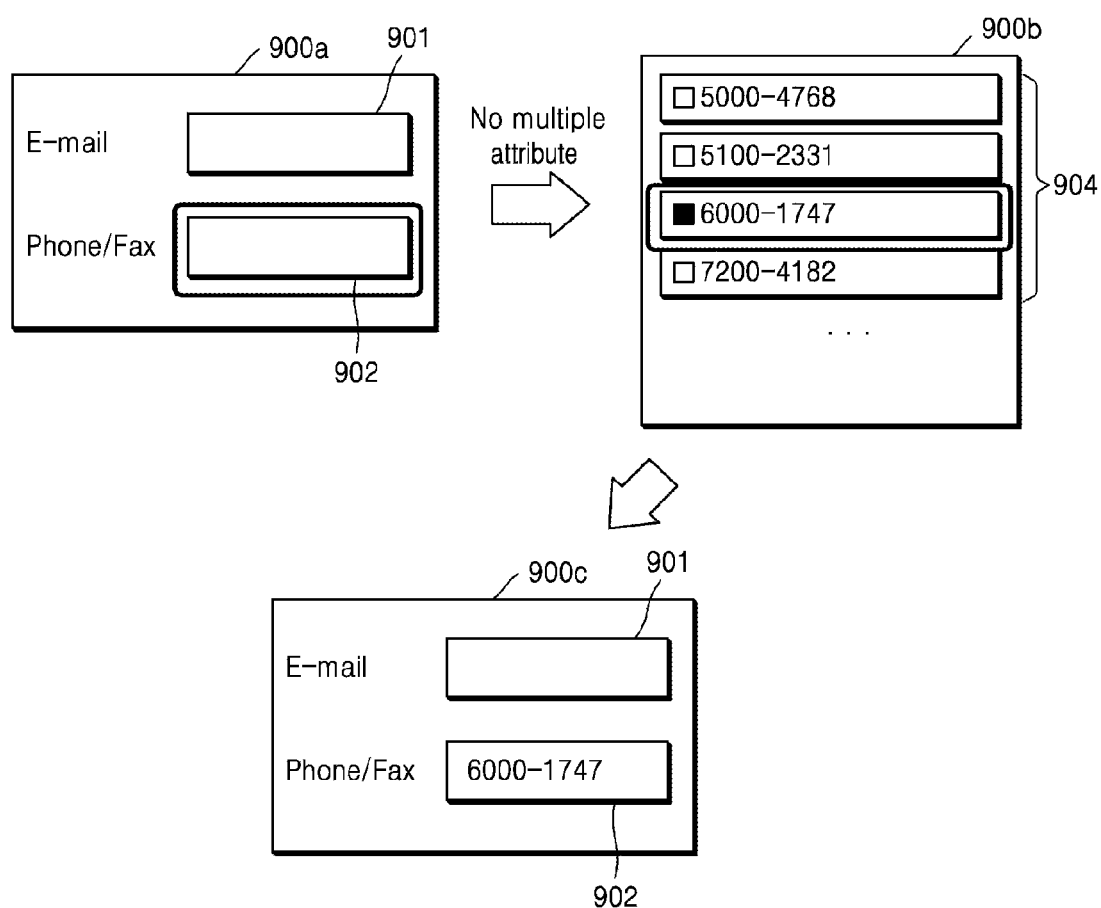
FIG. 9 illustrates an examples of receiving an input of selecting an address entry when a "multiple" attribute is not included in a form tag upon selection of an input box that receives an input of a phone number.

FIG. 9 illustrates an example of selecting an address entry when a "multiple" attribute is not included in a form tag upon selecting an input box for receiving a phone number. Referring to FIG. 9, when the user selects a phone number input box 902 on a web page 900a, the form handler 152 displays an address book list screen 900b. When the "multiple" attribute is not included in the form tag, the user may select only one entry from a plurality of address entries 904 displayed on the address book list screen 900b.

Therefore, when the user selects any one of the plurality of the address entries 904, the form handler 152 displays the selected phone number on the phone number input box 902 on the web page 900c.

Figure 10:
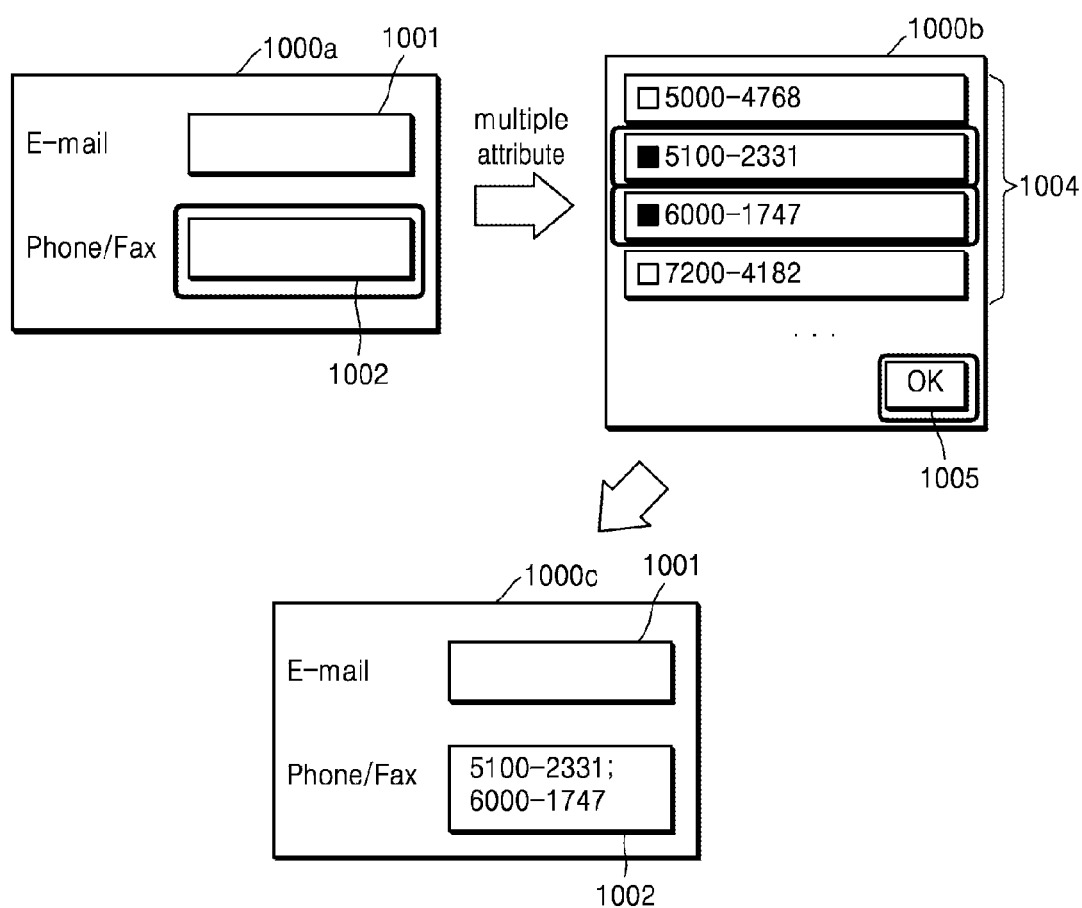
FIG. 10 illustrates an examples of receiving an input of selecting an address entry when a "multiple" attribute is included in a form tag upon selection of an input box that receives an input of a phone number.

FIG. 10 illustrates another example of selecting an address entry when a "multiple" attribute is included in a form tag upon selection of an input box for receiving an input of a phone number. Referring to FIG. 10, when a user selects a phone number input box 1002 on a web page 1000a, the form handler 152 displays an address book list screen 1000b. When the "multiple" attribute is included in the form tag, the user may select two or more entries from a plurality of address entries 1004 displayed on the address book list screen 1000b.

Therefore, when the user presses an OK button 1005 after selecting all the desired address entries from the plurality of address entries 1004, the form handler 152 determines that the selection of the address entries is completed, and then displays the selected phone numbers on the web page 1000c.

FIGS. 11 to 14 are flowcharts of operations included in methods of using an address book of an image forming apparatus on a web browser, according to embodiments of the present disclosure.

Figure 11:
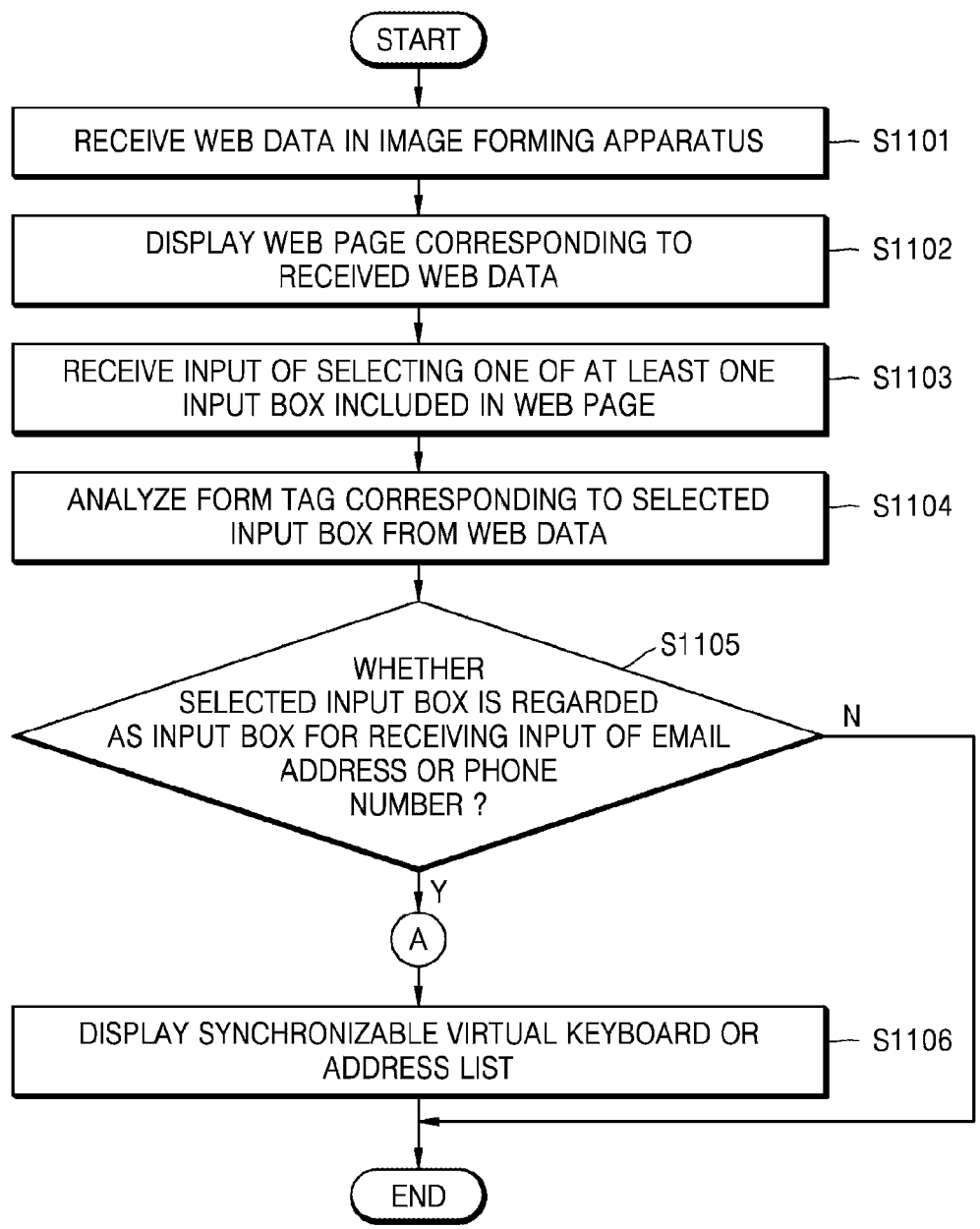
FIGS. 11 to 14 are flowcharts illustrating operations included in methods of using the address book of the image forming apparatus on a web browser according to embodiments of the present disclosure.

Referring to FIG. 11, in operation S1101, an image forming apparatus receives web data from an external web server. In operation S1102, a web page corresponding to the received web data is displayed on a display unit of the image forming apparatus. Here, a web browser of the image forming apparatus analyzes the web data in HTML format so as to form and display a web page. In operation S1103, one of at least one of input boxes included in the web page is selected by a user.

Then, in operation S1104, a form tag corresponding to the selected input box is analyzed from the web data received in operation S1101, and based on the analysis result, in operation S1105, the selected input box is analyzed to determine whether it is an input box for receiving an input of an email address or a phone number. When it is determined that the selected input box is to receive an input of an email address or a phone number, a virtual keyboard or an address list is displayed on a display unit of the image forming apparatus in the following operation S1106, wherein the virtual keyboard or the list of the address book is capable of being synchronized with or is configured to be synchronized with the address book of the image forming apparatus.

Figure 12:
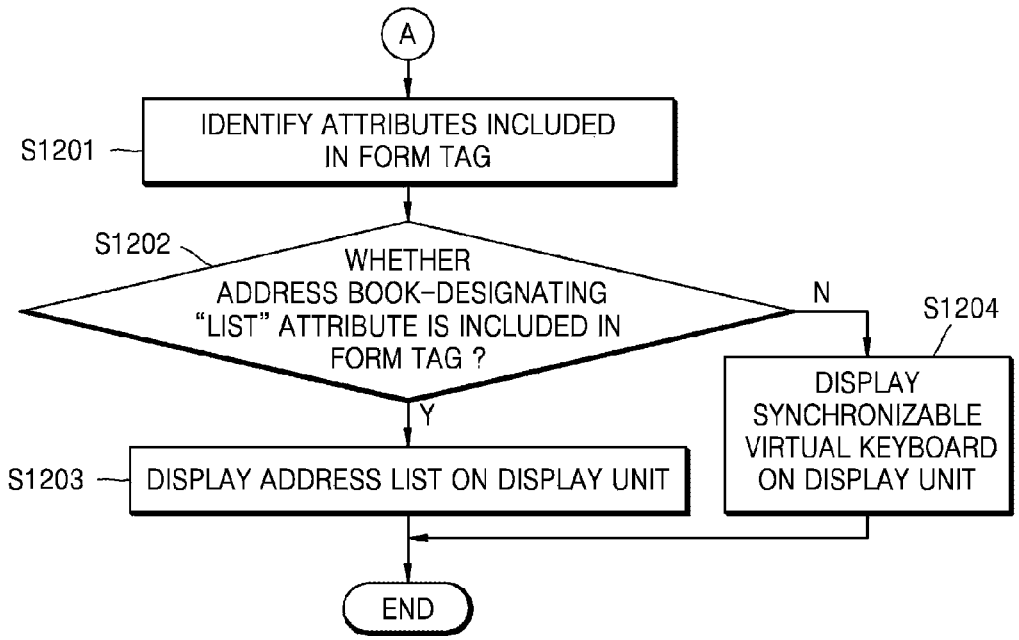
Figure 13:
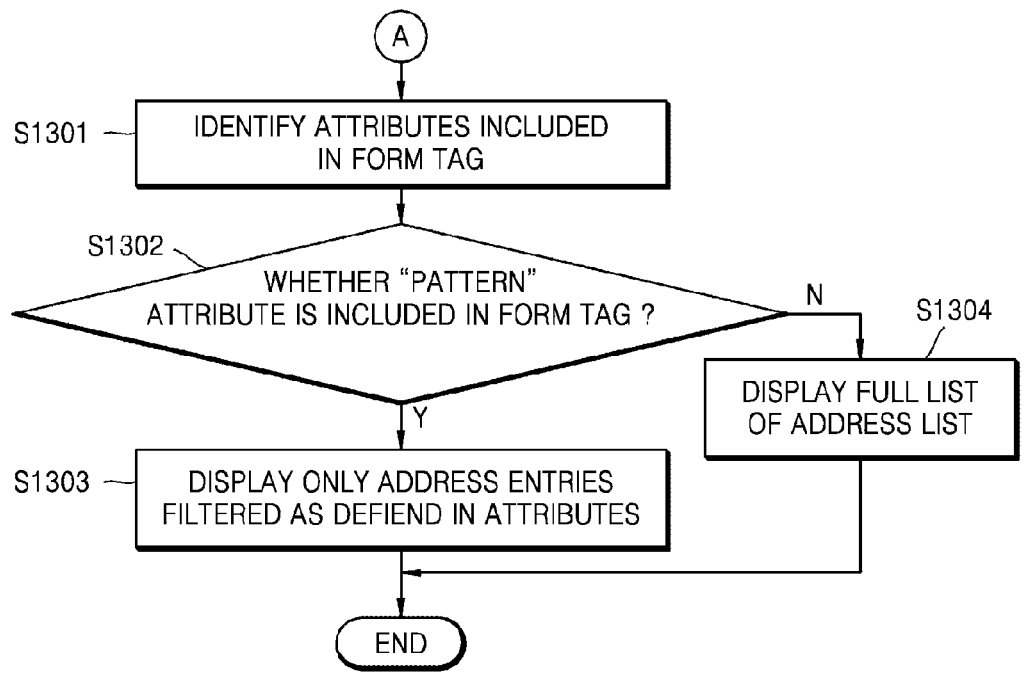

FIGS. 12 and 13 are flowcharts of operations included in the operation S1106 of FIG. 11 in detail.

Referring to FIG. 12, in operation S1201, attributes included in a form tag are identified. In operation S1202, it is determined whether a "list" attribute for designating an address book of the image forming apparatus is included in the identified attributes. If it is determined that the list attribute is included in the identified attributes, in the following operation S1203, an address list stored in the image forming apparatus is displayed on a display unit of the image forming apparatus. Otherwise, in the following operation S1204, a virtual keyboard capable of being synchronized with the address book stored in the image forming apparatus is displayed on a display unit of the image forming apparatus.

Referring to FIG. 13, in operation S1301, attributes included in a form tag are identified. In operation S1302, it is determined whether a "pattern" attribute is included in the identified attributes. If it is determined that the pattern attribute is included in the identified attributes, in the following operation S1303, only address entries that are filtered as defined in the attributes are displayed on a display unit of the image forming apparatus. For example, when the "pattern" attribute is defined as "a[a-zA-Z]*", only email address entries beginning with 'a' and consisting of alphabet letters among email addresses stored in the address book are displayed on a screen. However, if the "pattern" attribute is not included in the form tag, in the following operation S1304, a full list of the address book stored in the image forming apparatus is displayed on the display unit of the image forming apparatus.

Figure 14:
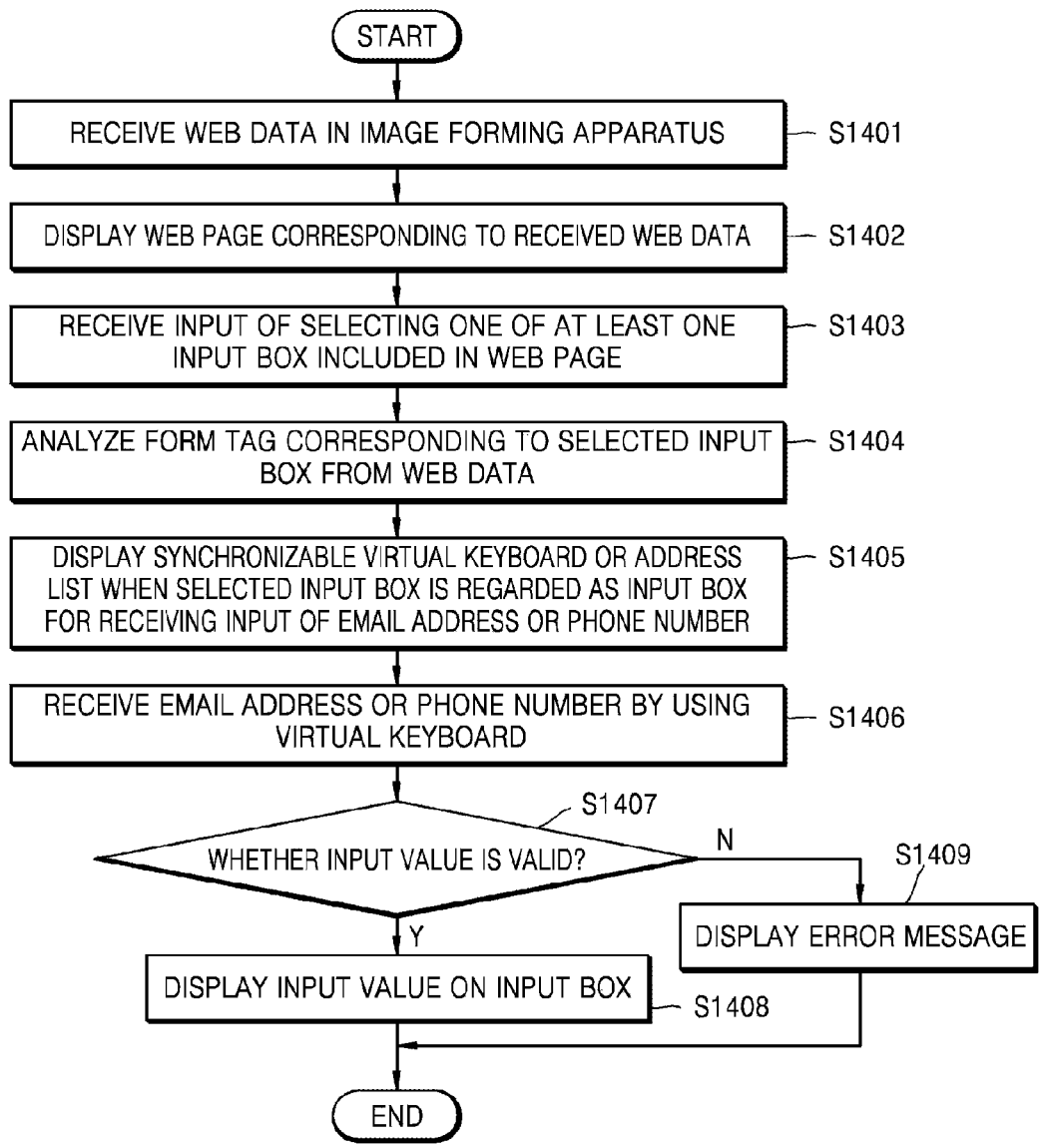

Referring to FIG. 14, in operation S1401, the image forming apparatus receives web data from an external web server. In operation S1402, a web page corresponding to the received web data is displayed on the display unit of the image forming apparatus. Here, a web browser of the image forming apparatus analyzes the web data in HTML format to form and display a web page. In operation S1403, one of at least one of input boxes included in the web page is selected by a user.

Then, in operation S1404, a form tag corresponding to the selected input box is analyzed from the web data received in operation S1401. Based on the analysis result, if the selected input box is to receive an input of an email address or a phone number, a virtual keyboard or an address list is displayed on a display unit of the image forming apparatus in the following operation S1405, wherein the virtual keyboard or the list of the address book is capable of being synchronized with or is configured to be synchronized with the address book of the image forming apparatus.

In operation S1406, the input of an email address or a phone number is received by a user by using the virtual keyboard, and in the following operation S1407, the input value is subjected to validation to validate that the input value is a valid value. Based on the validation result, if the input value is verified to be valid, in the following operation S1408, the input value is displayed on the selected input box. Otherwise, if the input value is verified to be invalid, in the following operation S1409, an error message is displayed on a screen.

As described above, according to the one or more of the above embodiments of the present disclosure, when a user selects an input box included in a web page, a web browser analyzes a form tag included in web data to determine whether the selected input box is an input box for receiving an input of an email address or a phone number. Then, a web browser displays a virtual text input device or an address list thereon, in which the virtual text input device is capable of being synchronized with or is configured to be synchronized with the address book of the image forming apparatus, thereby synchronizing the web page with the address book.

Therefore, without a need for a web page or web application developer to directly implement such synchronization between the web page and the address book, the present disclosure has advantages of using the address book stored in the image forming apparatus on the web browser.

In particular, based on whether the input tag included in the form tag is an "email" type or a "tel" type supported by HTML5, attributes included in the selected input box may be easily identified.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind weft-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the apparatuses described herein.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A method of using an address book of an image forming apparatus, the method comprising:
  by at least one hardware processor executing computer-executable instructions stored in at least one storage medium to cause:
    controlling the image forming apparatus to generate image data;
    receiving web data comprising an input box tagged by at least one form tag;
    displaying a web page corresponding to the received web data and including the input box on a display unit of the image forming apparatus, the display unit configured to selectively display at least one of:
      an address list including email addresses or phone numbers, and
      a virtual text input device capable of being synchronized with the address list;
    receiving a first input selecting the input box tagged by the at least one form tag;
    in response to the received first input, analyzing the at least one form tag tagged to the selected input box to determine whether the selected input box is to receive one of an email address input and a phone number input;
    in response to the determining that the selected input box is to receive the one of the email address input and the phone number input, controlling the display unit to display the at least one of the address list and the virtual text input device;
    receiving a second input selecting at least one of the email addresses or the phone numbers included in the address list based on the displayed at least one of the address list and the virtual text input device;

providing the generated image data for the selected at least one of the email addresses or the phone numbers, such that the generated image data is sent to the selected at least one of the email addresses or the phone numbers.

2. The method of claim 1, wherein the analyzing the at least one form tag comprises:
determining that the selected input box is to receive the email address input in response to an input tag included the at least one form tag being an "email" type supported by hypertext markup language (HTML) 5, and
determining that the selected input box is to receive the phone number in response to an input tag included the at least one form tag being a "tel" type supported by the hypertext markup language (HTML) 5.

3. The method of claim 1, wherein the displaying the at least one of the address list and the virtual text input device on the display unit comprises:
identifying attributes comprised in the at least one form tag;
determining whether to display the at least one of the address list and the virtual text input device according to the identified attributes; and
based on the determining to display the at least one of the address list and the virtual text input device according to the identified attributes, displaying the at least one of the address list and the virtual text input device.

4. The method of claim 3, wherein the displaying the at least one of the address list and the virtual text input device on the display unit comprises:
displaying the address list when a "list" attribute is comprised in the at least one form tag, wherein the "list" attribute designates the address list.

5. The method of claim 3, wherein the displaying the at least one of the address list and the virtual text input device on the display unit comprises:
displaying a filtered address list when a pattern attribute is comprised in the at least one form tag and when an input is received corresponding to the pattern attribute.

6. The method of claim 1, wherein the virtual text input device capable of being synchronized with the address list comprises a button that loads the address list.

7. A non-transitory computer-readable recording medium having embodied thereon a program for executing the method of claim 1.

8. An image forming apparatus for supporting a web browser, the image forming apparatus comprising:
a storage to store:
image data to be generated by the image forming apparatus, and
an address list including email addresses or phone numbers;
a communication unit to receive web data comprising an input box tagged by at least one form tag by performing communication with an external web server;
a web browser to display a web page corresponding to the received web data and including the input box;
a display unit to selectively display at least one of:
the address list, and
a virtual text input device capable of being synchronized with the address list; and
a controller to:
receive a first input selecting the input box displayed on the web page while the web browser displays the web page corresponding to the received web data;
in response to the received first input selecting the input box, analyze the at least one form tag tagged to the selected input box to determine whether the selected input box is to receive one of an address input and a phone number input;
in response to the determining that the selected input box is to receive the one of the address input and the phone number input, controlling the display unit to display the at least one of the address list and the virtual text input device;
receive a second input selecting at least one of the email addresses or the phone numbers included in the address list based on the displayed at least one of the address list and the virtual text input device;
providing the generated image data for the selected at least one of the email addresses or the phone numbers, such that the generated image data is sent to the selected at least one of the email addresses or the phone numbers.

9. The image forming apparatus of claim 8, wherein the controller is further to determine whether the selected input box is to receive the one of the email address input and the phone number input by analyzing the at least one form tag corresponding to the selected input box from the web data.

10. The image forming apparatus of claim 9, wherein the controller is further to determine that:
the input box is to receive the email address input in response to an input tag included in the at least one form tag being an "email" type supported by HTML5, and
the input box is to receive the phone number input in response to an input tag included in the at least one form tag being a "tel" type supported by the HTML5.

11. The image forming apparatus of claim 9, wherein the controller is further to identify attributes included in the at least one form tag, and
determine to display the at least one of the address list and the virtual text input device on the display unit based on the identified attributes.

12. The image forming apparatus of claim 11, wherein the controller is further to determine to display the address list when a "list" attribute is included in the at least one form tag, wherein
the list attribute designates the address list.

13. The image forming apparatus of claim 11, wherein the controller is further to determine to display a filtered address list when a pattern attribute is comprised in the at least one form tag.

14. The image forming apparatus of claim 8, wherein the virtual text input device capable of being synchronized with the address list comprises a button that loads the address list.

15. A method of entering data in an image forming apparatus, the method comprising:
by at least one hardware processor executing computer-executable instructions stored in at least one storage medium to cause:
controlling the image forming apparatus to generate image data;
displaying web data comprising an input box tagged by at least one form tag on a display unit of the image forming apparatus, the display unit configured to selectively display at least one of:
an address list including email addresses or phone numbers, and
a virtual text input device capable of being synchronized with the address list;
in response to the input box being selected, determining whether the selected input box of the displayed web data is for receiving one of an email address input and a phone number input based on the at least one form tag tagged to the input box;

in response to the determining that the selected input box is for receiving the one of the email address input and the phone number input, displaying the at least one of the address list and the virtual text input device on the display unit receiving an input value selecting at least one of the email addresses or the phone numbers based on the displayed at least one of the address list and the virtual text input device;

providing the generated image data for the selected at least one of the email addresses or the phone numbers, such that the generated image data is sent to the selected at least one of the email addresses or the phone numbers.

16. The method of claim 15, wherein the at least one form tag of the selected input box is analyzed to determine whether the selected input box for receiving the one of the email address input and the phone number input.

17. The method of claim 16, wherein the determining that the selected input box is for receiving the one of the email address input and the phone number input when an input tag included in the at least one form tag tagged to the selected input box is determined as one of an "email" type and a "tel" type supported by HTML 5.

18. The method of claim 15, wherein at least one email address entries beginning with a first character are displayed on the display unit when the first character of the email address is received as an input in the selected input box to be matched to a first character of at least one of the email addresses, the displayed at least one email address entries being obtained from the address list stored in the image forming apparatus.

19. An image forming apparatus supporting a web browser, the image forming apparatus comprising:

a storage to store:
  image data to be generated by the image forming apparatus, and
  an address list including email addresses or phone numbers;

a communication unit for receiving web data including an input box tagged by at least one form tag by communicating with an external web server;

a display unit for displaying the received web data including the input box and to selectively display at least one of:
  the address list, and
  a virtual text input device capable of being synchronized with the address list; and a controller to:

in response to the input box being selected, determine whether the selected input box of the displayed web data is for receiving one of an email address input or a phone number input based on the at least one form tag tagged to the input box, in response to the determining that the selected input box is for receiving the one of the email address input and the phone number input, control the display unit to display the at least one of the address list and the virtual text input device, receiving an input value selecting at least one of the email addresses or the phone numbers based on the displayed at least one of the address list and the virtual text input device, providing the image data for the selected at least one of the email addresses or the phone numbers, such that the generated image data is sent to the selected at least one of the email addresses or the phone numbers.

* * * * *